Patented Apr. 10, 1951

2,548,509

UNITED STATES PATENT OFFICE 2,548,509

FUNGICIDAL COMPOSITIONS CONTAINING HEXACHLOROCYCLOPENTADIENE

Howard L. Yowell, Westfield, N. J., assignor to Standard Oil Development Company, a corporation of Delaware No Drawing. Application May 22, 1948, Serial No. 28,761

6 Claims. (Cl. 167—30)

This invention relates to new and useful improvements in parasiticidal preparations and more particularly to improved fungicides, insecticides and germicides. This invention also relates to methods of protecting organic material subject to attack by low orders of organisms.

It has now been found that hexachlorocyclopentadiene is extremely effective for destroying or checking the growth of fungi. This compound may thus be used as a novel ingredient to seed and plant protectants because of its disinfecting action on soil containing harmful organisms.

Hexachlorocyclopentadiene

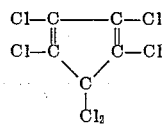

is a liquid boiling at approximately 240° C. at atmospheric pressure and is stable towards heat. It can consequently be used for fumigation purposes.

It is surprising to find that hexachlorocyclopentadiene is a good insecticide and especially surprising to find that it has exceptionally high fungicidal activity in view of the fact that related compounds are substantially inert. Hexachlorobutadiene is substantially inactive as a parasiticide and chlorinated benzene is not fungicidal (Horsfall, "Fungicides and Their Action").

The preparation of hexachlorocyclopentadiene is known and is given in the literature (Krynitsky and Bost, J. Am. Chem. Soc. 69, 1918 (1947)). One of the methods of preparing it is by the high temperature exhaustive chlorination at 470° C. of polychloro derivatives of open chain and cyclic pentanes and hexanes such as n-pentane, cyclopentane, isopentane, 2-methylpentane, 2,2-dimethyl butane, and the like.

The compound of this invention may be applied to parent materials to rid them of harmful organisms and prevent fungus growth and mildew formation. Since this compound is non-phytotoxic at concentrations where its pesticidal activity is still exceptionally high it may be applied safely to a wide variety of plants. This is especially true of plants susceptible to metal poisoning. Some of the additional parent materials to which it may be applied for protective purposes are leather, wood, fur, wool coated fabrics and other substances, even including animal bodies.

Hexachlorocyclopentadiene may best be applied as a diluted dust mixture with a carrier such as clay talc or clay bentonite. It may also be applied as a spray in a liquid carrier either as a solution in a solvent or as a suspension in a non-solvent such as water. When applied as a spray in water it may be desirable to incorporate a wetting agent.

Among the solvents for hexachlorocyclopentadiene are hydrocarbons such as petroleum fractions, alcohols, ketones, esters, chlorinated hydrocarbons including methyl chloride and other so called "aerosol bomb" solvents, and the like.

The water-soluble wetting agents that may be used comprise the sulfates of long chain alcohols such as dodecanol up to octadecanol, sulfonated amide and ester derivatives, sulfonated aromatic and mixed alkyl-aryl sulfonate derivatives, esters of fatty acids such as ricinoleic acid ester of sorbitol, and petroleum sulfonates of $C_{10}$ to $C_{20}$ length. The non-ionic emulsifying agents such as the ethylene oxide products of alkylated phenols may also be used. It is to be understood that these and similar compounds are intended when the term wetting agent is used hereafter.

By virtue of its solubility in the "Freons" i. e. $CCl_3F$, $CCl_2F_2$, $CClF_3$, $CHCl_2F$ etc., and other aerosol type solvents together with its volatility characteristics, hexachlorocyclopentadiene is adapted for use in aerosol compositions for space spray and fumigation applications. When put up in this form it can be dispensed in the conventional pressure containers known in the art. It can of course be volatilized by application of heat in the area to be fumigated.

Since hexachlorocyclopentadiene is non-ionic in nature, that is, possessing no groups readily reactive with heavy metals and the like, it is readily compatible with other insecticidal and fungicidal mixtures and possesses a high degree of chemical stability in the atmosphere which makes it ideally suitable for use as agricultural spray residues. It may therefore be admixed with carriers that are themselves active such as other parasiticides, hormones, herbicides, fertilizers and wetting agents, stomach and contact insecticides such as the arsenates, fluorides, rotenone and the various fish poisons, and organic insecticides such as di (p-chlorophenyl)-trichloroethane, benzenehexachloride and similar products may also be advantageously added.

This invention will be better understood by reference to the following examples of the use of the compound of this invention for the stated purposes.

EXAMPLE 1

In order to demonstrate that hexachlorocyclopentadiene is not toxic to vegetable life in concentrations at which it is an effective pesticide, the following compositions were sprayed on mature, thriving plants (Coleus blumei). The tabulated data show that it is sufficiently mild in phytocidal activity to be applicable for combatting crop pests without danger of harming the crop.

Table
TOLERANCE OF COLEUS BLUMEI TO COMPOSITIONS CONTAINING HEXACHLOROCYCLOPENTADIENE

| Fungicide Composition | Fungicide Composition in Aqueous Spray Applied to Plant | Condition of plant after 3 days |
|---|---|---|
| | Per cent | |
| 10 pts. hexachlorocyclopentadiene 89 pts. Attaclay (finely divided fuller's earth) 1 pt. Wetting agent. | 1 2 | No injury. Do. |
| 50 pts. Hexachlorocyclopentadiene 49 pts. Attaclay (finely divided fuller's earth) 1 pt. Wetting agent. | 1 2 | Do. Very slight injury. |
| 50 pts. Hexachlorocyclopentadiene 45 pts. Horticultural Spray oil (Petroleum base) 5 pts. Emulsifier | 0.2 0.5 1.0 | No injury. Do. Do. |

EXAMPLE 2

The bactericidal properties of hexachlorocyclopentadiene was shown to be high against a variety of bacteria when tested by the agar plate method. Phenol coefficients by standard technique against E. typhus and Staph. aureus were 25 and 33, respectively.

EXAMPLE 3

The following tabulated data show that hexachlorocyclopentadiene possesses excellent fungicidal activity against several test organisms. Similar data are presented for hexachlorobutadiene for purposes of contrast.

| Compound | Fungicidal Activity [1] | |
|---|---|---|
| | Alternaria solani | Sclerotinia fructicola |
| Hexachlorocyclopentadiene | 0.0001 | 0.0001 |
| Hexachlorobutadiene | 0.1 | 0.1 |

[1] Figures in columns represent minimum concentrations of compound suspended in water required to prevent germination of 50% of the treated test spores.

It is to be understood that the invention is not limited to the specific examples which have been offered merely as illustration and that modification may be made within the scope of the appended claims without departing from the spirit of the invention.

What is claimed is:

1. A fungicidal composition comprising hexachlorocyclopentadiene as the active ingredient admixed with a dispersing agent which lowers the surface tension of water and thereby promotes aqueous emulsions of hexachlorocyclopentadiene.

2. A fungicidal composition as in claim 1 in which the dispersing agent is a surface tension reducing agent for water selected from the group consisting of long-chain alcohol sulfates, sulfonated amide derivatives, sulfonated ester derivatives, sulfonated aromatic derivatives, sulfonated alkyl-aryl derivatives, and petroleum sulfonates of $C_{10}$ to $C_{20}$ length.

3. A fungicidal aqueous emulsion comprising in combination hexachlorocyclopentadiene, water, and a minor proportion of a dispersing agent which lowers the surface tension of water.

4. A fungicidal dust composition comprising hexachlorocyclopentadiene admixed with a powdered clay.

5. A fungicidal dust composition as in claim 4 in which the clay is bentonite.

6. The method of combatting fungi which comprises treating material liable to attack by said fungi with a fungicidal composition comprising hexachlorocyclopentadiene as the active ingredient admixed with a dispersing agent which lowers the surface tension of water and promotes aqueous emulsions of hexachlorocyclopentadiene.

HOWARD L. YOWELL.

REFERENCES CITED

The following references are of record in the file of this patent:

UNITED STATES PATENTS

| Number | Name | Date |
|---|---|---|
| 1,947,926 | Steindorff et al. | Feb. 20, 1934 |
| 2,010,841 | Bender | Aug. 13, 1935 |
| 2,321,023 | Goodhue | June 8, 1943 |
| 2,329,074 | Muller | Sept. 7, 1943 |

OTHER REFERENCES

Krynitsky et al.: J. Am. Chem. Soc., vol. 69, p. 1918, Aug. 1947.